Oct. 29, 1940.   W. F. ROSS   2,219,907
TOOL HOLDER ASSEMBLY
Filed April 11, 1938   2 Sheets-Sheet 1
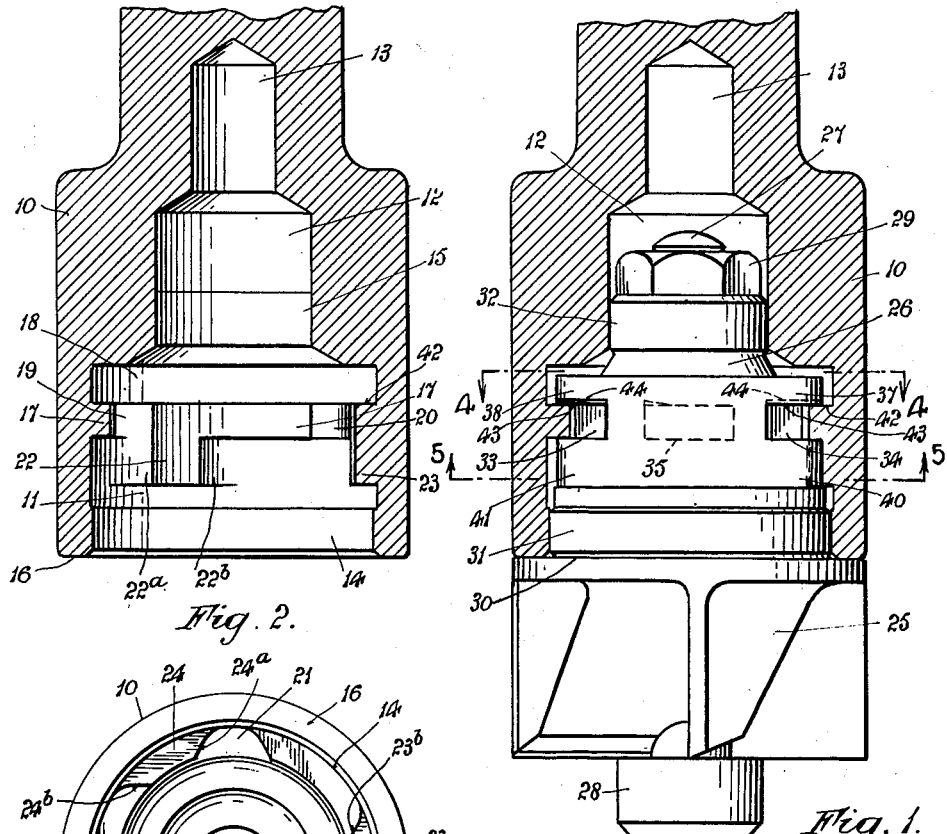
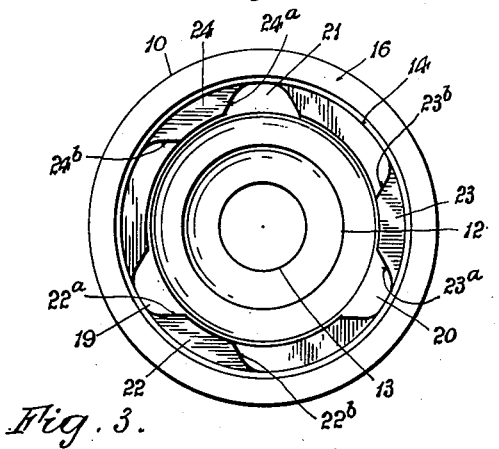
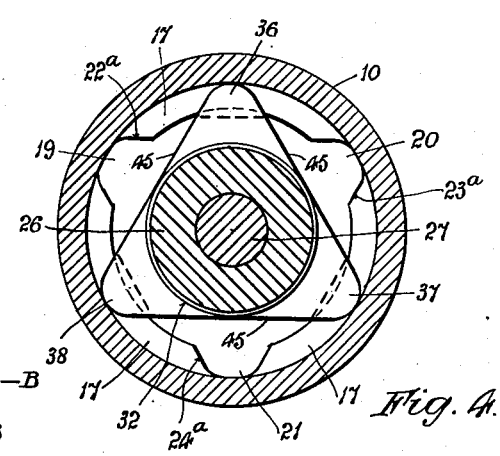
Walter F. Ross.
INVENTOR.
BY Stanley Lightfoot
ATTORNEY.

Oct. 29, 1940.                W. F. ROSS                 2,219,907
                         TOOL HOLDER ASSEMBLY
                   Filed April 11, 1938        2 Sheets-Sheet 2
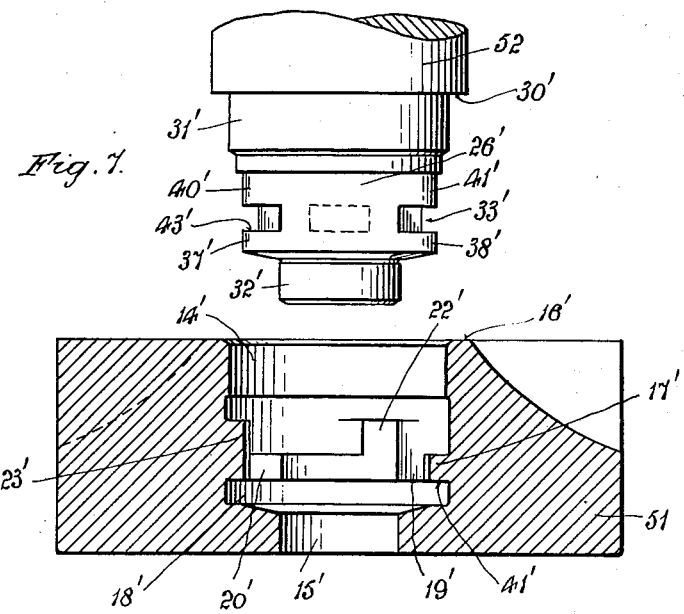
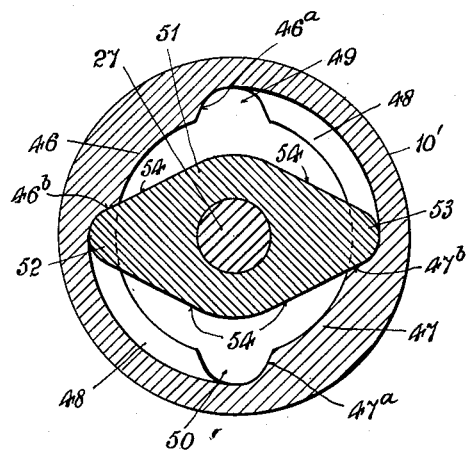
Walter F. Ross.
INVENTOR.
BY D. Stanley Lightfoot.
ATTORNEY.

Patented Oct. 29, 1940

2,219,907

UNITED STATES PATENT OFFICE 2,219,907

TOOL HOLDER ASSEMBLY

Walter F. Ross, Detroit, Mich.

Application April 11, 1938, Serial No. 201,274

7 Claims. (Cl. 279—93)

This invention relates to interchangeable tools and their holders wherein means are provided for rapid attachment and detachment of the tools to and from the holders, a well-known example of which is the ordinary bayonet joint. Many modifications of this joint have from time to time been suggested with a view to obtaining better driving and holding characteristics, but in all of the expedients which have come to the applicant's attention the method of obtaining one or more of the desired benefits has been at the expense of some other desirable feature.

It is the purpose of this invention to provide a holder and interchangeable tool combination so devised that it will meet all of the requirements as to strength, rigidity, accuracy, support, machinability, application and distribution of forces, and simplicity of construction and operation to a very high degree, whereby the device may be readily made to withstand hard usage and perform operations of great precision. The improved device also admits of economy in its manufacture and of methods of manufacture permitting a high production with precise interchangeability of parts.

It is also an object of the invention to provide a locking arrangement wherein the driven lugs of the tool will be adequately supported and put in a state of compression in use as distinguished from a state of pure shear or tension; and to provide a locking arrangement wherein the driving and driven lugs of the holder and the tool may be both ground in counterpart to provide true contacting surfaces, and especially contacting surfaces of substantial area as distinguished from point or line contact for greater strength or driving power.

It is an object to provide in the driving and driven lugs substantial coacting bearing faces extending at an acute angle to the radius of the tool.

A still further object is to provide a tool in which the resultant of the forces on the driving lugs is directed towards the axis of the tool, tending to center the tool in its bearing and distribute pressures evenly on the bearing.

The invention also contemplates the related generation of the operating faces of the driving and driven lugs in a manner facilitating their grinding and insuring a related accuracy therebetween in their circular disposition about the axis of the tool.

A further object of the invention is to provide for the ready guiding of the shank of the tool into engagement with the body of the holder whereby the said tool may be quickly inserted and locked without any trouble in locating the ports for the entry of the lugs.

Furthermore the invention permits a provision of continuous unbroken circular bearings both adjacent and remote from the face of the holder; and also permits, in addition to the ground face of the holder against which the tool abuts, a further and parallel ground face within the holder insuring positive longitudinal location of the tool without the looseness ordinarily required, so that the tool may be positively and accurately held both radially and longitudinally of the holder.

The invention also provides for a dual arrangement of lugs, wherein one set of lugs takes the radial thrust and the other set of lugs takes longitudinal pull independent of the first mentioned lugs.

Still further objects and advantages subsidiary to or resulting from the aforesaid objects, or from the construction or operation of the invention as it may be carried into effect, will become apparent as the said invention is hereinafter further described.

In carrying the said invention into effect, I may provide a tool holder with a stepped bore, the inner and smaller bore being ground to a bearing surface near its open end and the outer and larger bore also ground to a bearing surface near its open end, said larger bore being interrupted intermediate its length by an annular rib cut away, say, at three equidistant points to provide ports therethrough. Three equidistant abutments may be provided on the wall of said larger bore between said rib and the ground outer bearing of the said bore. The tool shank is provided with bearings in counterpart of the bearing surfaces of the holder referred to, and between these bearings of the tool shank is disposed the shank body having three lugs thereon and of smaller radial projection than the radius of the larger bearing, and a further series of lugs adapted to enter the ports of the annular rib and by rotation engage and travel over the inner face of the said rib until the first mentioned lugs are brought into engagement with the abutments, of the holder. The engaging faces of the first mentioned lugs and said abutments are intended to be ground in counterpart, after heat treating of the tool, to present a material contacting area including a substantially plane surface extending at an acute angle to the radius of the tool, and the face and inner surface of the rib of the holder also ground to agree with correspondingly ground faces on the back of the tool and the under surface of the rib-engaging lugs.

All of which is more particularly described and ascertained hereinafter, by way of example, having reference to the accompanying drawings, wherein:

Figure 1 is a section of a tool holder, showing in full lines a tool engaged therein, embodying the said invention;

Figure 2 is a detail section of the holder;

Figure 3 is an end elevation of the same;

Figure 4 is a detail cross section taken on a plane indicated by the line 4—4 in Figure 1;

Figure 5 is a detail cross section taken on a plane indicated by the line 5—5 in Figure 1;

Figure 6 is a similar view to Figure 5 showing a modified form of the device wherein two driving lugs are provided instead of three;

Figure 7 is an elevation of a modified form of tool holder such as may be used with a spot face cutter, the male element of the locking device being formed on the tool holder; and Figure 8 is a sectional view of a tool adapted to use with the said holder Figure 7.

Similar characters of reference indicate similar parts of the several figures of the drawings.

Referring first to Figures 1 to 5, inclusive, 10 is the head of a tool holder which may be of any external form or shape, in this case cylindrical, and is shown as being bored in three main steps of progressively diminishing diameter 11, 12, and 13, the inner marginal wall of the largest bore 11 being internally ground at 14 to form an annular and continuous bearing therewithin, and the bore 12 being also internally ground at 15 to provide a further annular bearing within the tool holder. The face 16 of the holder is also ground to provide a true thrust surface.

Within the bore 11 and formed integral with the head of the tool holder is an annular inwardly projecting rib 17 providing a channel 18 therebeyond; the said rib being cut away at 19, 20, and 21 to provide ports therethrough leading from the main part of the bore 11 to the said channel 18. Adjacent to these ports and extending from the underside of the said rib towards the open end of the tool holder, but terminating short of the bearing 14, are abutments 22, 23, and 24, the rear faces 22ª, 23ª, and 24ª of which abutments are shown as being continuous in each case with one of the walls of the said ports 19, 20, and 21, respectively. The driving faces 22ᵇ, 23ᵇ, and 24ᵇ of the said abutments terminate at and are overhung by the annular rib 17 as clearly shown in Figure 2 of the drawings.

The tool 25 is shown as being provided with the shank 26, and a pilot bolt 27 passes through the tool and shank with the pilot head 28 at the outer end and the usual securing nut 29 at the inner end in the usual manner, the rear surface 30 of the tool being ground to insure accurate square seating on the ground face 16 of the holder. The shank is provided with a large ground bearing surface 31 to engage in the bearing 14 of the holder, and, at or near the inner end of the shank, a bearing surface 32 of reduced diameter to engage the ground bearing 15 of the bore 12 of the holder for correct axial location and support of the tool in the holder.

Between these bearings the body of the shank is shown as being of substantially triangular formation, the apices of which triangle are rounded and extend to a point radially somewhat less than the bearing 14 of the holder but materially greater than the internal radius of the rib 17, these apex portions of the triangular body of the shank being slotted or recessed at 33, 34, and 35 to provide on the said shank lugs 36, 37, and 38 spaced above similarly shaped lugs, 39, 40, and 41. The lugs 36, 37, and 38 will be hereinafter referred to as the locking lugs, and the lugs 39, 40, and 41 as the driving lugs.

It will be seen that the shape of the locking lugs admits of their being passed through the ports 19, 20, and 21 of the rib 17 into the channel 18 of the holder when the tool is applied thereto, and that in the act of so applying the tool the said lugs may be simply brought into contact with the rear surfaces 22ª, 23ª, and 24ª, of the abutments which surfaces will then serve to guide the said lugs upwardly through the said ports and avoid any difficulty in locating such ports; and that the slots 33, 34, and 35 are so positioned along the length of the tool shank that, when the rear surface 30 of the tool contacts the face 16 of the holder, these slots will be coincident with the rib 17 and will, therefore, permit rotation of the tool and its shank in a clockwise direction, as viewed in Figure 5, the said locking lugs traveling over the inner face of the said rib 17 and within the channel 18 until the driving lugs 39, 40, and 41 engage the driving faces 22ᵇ, 23ᵇ, and 24ᵇ of the abutments 22, 23, and 24, whereby the tool is then effectively locked in driving relation to the holder.

The inner surface 42 of the rib 17, being free of obstruction, may be readily ground in predetermined parallel relation to the ground face 16 of the holder, and the under surface 43 of the locking lugs 36, 37, and 38 may be similarly ground in relation of the ground rear surface 30 of the tool 25, so that accurate and effective longitudinal support of the tool in the holder may be secured without undesirable looseness or lash, as will be apparent. This support together with the unbroken radial support provided by the bearings 15 and 16 admits of a very high degree of accuracy and rigidity in the assembled tool.

Where these closely related surfaces 16 and 42 are provided the leading edges of the lugs 36, 37, and 38 may be chamfered or bevelled as at 44 to facilitate the initial passage of the said lugs over the ground surface 42 of the rib 17.

While the construction described admits of the uninterrupted and freely accessible grinding of the bearings 14 and 15, and the surfaces 16 and 42 when and as desired and the corresponding grinding of the bearings 31 and 32 of the holder and surfaces 30 and 43 on the tool and its shank, still further and important grinding or machining operations are rendered readily available on the driving elements, namely, the surfaces 22ᵇ, 23ᵇ, and 24ᵇ of the abutments 22, 23, and 24, respectively, due to their being freely exposed in the open end of the holder and not concealed within the channel according to the general practice, and the driving lugs 39, 40, and 41 due to the continuous contour of said driving lugs with the connecting faces 45 of the triangular portion of the shank.

Hence, the triangular surface of the shank and the rounded apices forming the driving lugs thereof may be ground as by means of generating such form to provide not only the desirable ground surfaces of the abutments but perfect angular relationship thereof due to the true geometrical form. Furthermore, this same triangular generation may be applied to the grinding of the faces 22ᵇ, 23ᵇ, and 24ᵇ of the said abutments 22, 23, and 24, a grinding wheel of the radius of the rounded ends of the driving lugs being moved from the driving face of one abutment to the driving face of the next abutment along paths indicated by the lines A—A, B—B, and C—C as indicated in Figure 5.

Thus, not only will truly related arcuate faces be ground on the said abutments to accurately receive the driving lugs 39, 40, and 41 but part of these faces 22$^b$, 23$^b$, and 24$^b$ will extend in the form of flats along the correspondingly ground side walls of the driving lugs as tangents of the arc of curvature of the said driving lugs, thereby providing a large area of absolute contact between each and every driving lug and its corresponding abutment. Furthermore, in the arrangement as illustrated, these flat contact surfaces are extended at an acute angle to the radius of the tool, providing a very desirable application of the driving forces. Also, that part of the surface 45 extending rearwardly from each driving lug will be seen to be at a considerable angle to the plane of the contact face of the said lug whereby great buttressing support is afforded the lug in which the material of the shank behind such contacting face of the lug is put into a state of marked compression as distinguished from the usual shear condition present where driving lugs are simply projections on an otherwise cylindrical surface.

Although I prefer the triangular arrangement of the driving lugs described as emphasizing the desirable characteristics of the invention in a very satisfactory manner, the number and disposition of the driving contacts between the holder and the tool may be varied as, for instance, in the example shown in Figure 6, wherein the holder 10' is provided with two internal abutments 46 and 47 having rear guiding faces 46$^a$ and 47$^a$, respectively, and driving faces 46$^b$ and 47$^b$, respectively, these abutments extending forwardly of the tool from the internal annular rib 48 in the same manner already described with reference to the abutments 22, 23, and 24 in Figures 1 to 5. 49 and 50 are the ports in the said rib, serving the purpose of the ports 19 and 20 of the aforesaid figures.

51 is the tool shank, shaped to provide two lugs 52 and 53 ground in rounded form in the manner already described and merging with faces 54 tangential thereto and to the center body portion of the shank as shown, whereby a continuous generated surface may be ground and the acute angularity of the flat portions of the contacting surfaces of the driving lugs and their abutments may be secured where it is desired to maintain this desirable feature.

Figures 7 and 8 illustrate how the disposition of the driving elements on the tool and its holder may be readily reversed, where though necessary or desirable, 14' and 15' being the larger and smaller bearing surfaces, in this case formed in the body of the tool 51, 16' and 42' being the ground faces formed on the face of the tool and on the internal angular rib 17', respectively, while 18' is the annular channel to which the ports 19' and 20' in the said rib lead to permit passage of the locking lugs 37' and 38' of the tool spindle 52, when the said spindle is rotated to bring the said lugs into proper entering position against the rear of the abutments 22' and 23' of the tool.

The shank 26' of the spindle 52 is shaped in the manner of the shank 26, previously described, and slotted at 33' to clear the rib 17' and permit the driving lugs 40' and 41' to engage their respective abutments in the manner also described. 31' and 32' are the cylindrical bearings on the tool spindle to engage the bearings 14' and 15' of the tool, while 30' and 43' indicate the machined or ground surfaces of the tool spindle located to engage the corresponding machined or ground surfaces 16' and 42' of the tool.

In view of the foregoing, it will be understood that herein, and in the claims, the use of the terms "tool" or "holder" may be read as being interchangeable wherever the context so admits, the provision of the male portion on the driving or driven element being a matter of mechanical expedience.

This invention may be developed within the scope of the following claims without departing from the essential features of the said invention, and it is desired that the specification and drawings be read as being merely illustrative and not in a limiting sense, except as necessitated by the prior art.

What I claim is:

1. In a device of the class described, in combination, a member having a bore open to the face thereof, an annular rib in said bore providing an inner annular channel remote from the said face, said rib having a plurality of ports therethrough to said channel, abutments situated between said rib and the open end of said bore, a second member, a shank on said second member entering said bore, locking lugs on the outer end portion of said shank to pass through said ports and by rotation engage the rear of said rib, and further driving lugs spaced rearwardly from said locking lugs on said shank for driving engagement with said abutments when said shank is so rotated.

2. In a device of the class described, in combination, a member having a bore open to the face thereof, an annular rib in said bore, an inner annular channel remote from said face, the inner surface of said rib being machined to a definite parallel relation to said face, said rib having a plurality of ports therethrough to said channel, abutments situated between said rib and the open end of said bore, a second member having a shoulder to engage the face of said first member, a shank on said second member entering said bore, locking lugs on the outer end portion of said shank to pass through said ports and by rotation engage the machined rear surface of said rib, the machined surfaces of said lugs and said shoulder having the same longitudinal relation as the machined surface of the rib and face of said first member, and further driving lugs spaced rearwardly from said locking lugs on said shank for driving engagement with said abutments when said shank is so rotated.

3. In a device of the class described, in combination, a member having a bore open to the face thereof, an annular rib in said bore providing an inner annular channel remote from the said face, said rib having a plurality of ports therethrough to said channel, abutments situated between said rib and the open end of said bore and adjacent said ports to provide guiding faces to said ports, a second member, a shank on said second member entering said bore, locking lugs on the outer end portion of said shank to pass over the guiding faces of said abutments and through said ports to said channel, and further driving lugs spaced rearwardly from said locking lugs on said shank for driving engagement with said abutments when said first mentioned locking lugs are rotated in said channel for that purpose.

4. In a device of the class described, in combination, a member having a bore open to the face thereof, an annular rib in said bore providing an inner annular channel remote from the said face, said rib having a plurality of ports therethrough to said channel, abutments situated between said rib and the open end of said bore, a second member, a shank on said second member entering said bore, locking lugs on the outer end portion of said shank to pass through said ports and by rotation engage the rear of the said rib, further driving lugs spaced rearwardly from said locking lugs on said shank for driving engagement with said abutments when said shank is so rotated, and the said last mentioned driving lugs and said abutments having machined arcuate contacting faces in counterpart of one another.

5. In a device of the class described, in combination, a member having a bore open to the face thereof, an annular rib in said bore providing an inner annular channel remote from the said face, said rib having a plurality of ports therethrough to said channel, abutments situated between said rib and the open end of said bore, a second member, a shank on said second member entering said bore, locking lugs on the outer end portion of said shank to pass through said ports and by rotation engage the rear of the said rib, further driving lugs spaced rearwardly of said locking lugs on said shank for driving engagement with said abutments when said shank is so rotated, and the said last mentioned driving lugs and said abutments having machined arcuate contacting faces extending into flat contacting faces at an acute angle to the radius of the members through said lugs.

6. In a device of the class described, in combination, a member having a bore open to the face thereof, an annular rib in said bore, providing an inner annular channel remote from said face, said rib having three equidistant ports in circular series therethrough to said channel, abutments situated between said rib and the open end of said bore, a second member having a shank of substantially triangular cross section adapted to project inwardly of the bore through said ports to said channel, the apex portions of said shank being slotted to clear said rib and provide locking lugs on the outer end portion of said shank for rotation into said channel, the apex portions of said shank below the slots forming driving lugs for engagement with said abutments, and coacting bearing means for said members.

7. In a device of the class described, in combination, a member having a bore open to the face thereof, an annular rib in said bore, providing an inner annular channel remote from said face, said rib having three equidistant ports in circular series therethrough to said channel, abutments situated between said rib and the open end of said bore, a second member having a shank of substantially triangular cross section adapted to project inwardly of the bore through said ports to said channel, the apex portions of said shank being slotted to clear said rib and provide lugs for rotation into said channel, the apex portions of said shank below the slots forming driving lugs and having rounded ends, said abutments having driving faces in counterpart of both the rounded ends of said driving lugs and the adjacent flat surfaces of said shank for engagement therewith.

WALTER F. ROSS.